United States Patent
Wu

(10) Patent No.: US 6,755,285 B1
(45) Date of Patent: Jun. 29, 2004

(54) WHEELED WALKER BRAKE LEVER MOUNTING STRUCTURE

(76) Inventor: David Wu, No. 35-1, Jih Hsin Street, Tu Cheng City, Taipei Hsien (TW)

( * ) Notice: Subject to any disclaimer, the term of this patent is extended or adjusted under 35 U.S.C. 154(b) by 0 days.

(21) Appl. No.: 10/219,322

(22) Filed: Aug. 16, 2002

(51) Int. Cl.[7] ............................. F16D 65/14; F16C 1/10
(52) U.S. Cl. ....................... 188/2 D; 188/19; 74/502.02; 74/501.6
(58) Field of Search ........................ 188/2 D, 2 F, 19; 74/479.01, 480 R, 490.12, 490.13, 490.14, 491, 500.5, 501.6, 502.2

(56) References Cited

U.S. PATENT DOCUMENTS

| | | | | | |
|---|---|---|---|---|---|
| 5,664,460 A | * | 9/1997 | Hewson | ...................... | 74/502.2 |
| 5,878,625 A | * | 3/1999 | Hu | ............................. | 74/502.2 |
| 6,622,587 B1 | * | 9/2003 | Wu | ............................. | 74/502.2 |
| 6,647,825 B1 | * | 11/2003 | Lin | ........................... | 74/502.2 |

* cited by examiner

*Primary Examiner*—Thomas Williams
(74) *Attorney, Agent, or Firm*—Troxell Law Office PLLC

(57) ABSTRACT

A wheeled walker brake lever mounting structure is constructed to include a mounting base frame fixedly fasten ed to one handlebar of a wheeled walker, a brake cable inserted through the mounting base frame and connected to a brake assembly at rear wheels of the wheeled walker, a brake lever pivoted to the mounting base frame for turning by hand in either of two reversed directions to pull the brake cable and to further stop the wheeled walker, and an auxiliary control block coupled to one side of the mounting base frame for turning with the hand to move the brake lever upwards or downwards and to achieve a braking action.

4 Claims, 10 Drawing Sheets

WHEELED WALKER BRAKE LEVER MOUNTING STRUCTURE

BACKGROUND OF THE INVENTION

1. Field of the Invention

The present invention relates to a wheeled walker and, more specifically, to a wheeled walker brake lever mounting structure, which is easy to install and stable in operation.

2. Description of the Related Art

FIG. 1 illustrates a conventional wheeled walker 5. When the user pulls the brake levers 511 at the grips 51 of the handlebars 52, the brake cables 6 are driven to stop the wheels 54. The handlebars 52 are respectively inserted into the front wheel frame bars 53 and axially adjustably secured thereto at the desired elevation. When the handlebars 52 set in the top limit position, the distance between the handlebars 52 and the axes 541 of the rear wheels 54 is relatively increased. At this time, the wheeled walker 5 may vibrate when user pulling the brake levers 511 to stop the wheeled walker 5 suddenly. Furthermore, the user cannot keep the brake levers 511 in the braking position without holding the brake levers 511 with the hands. A person suffering a problem with the fingers or hands is difficult to control the brake levers 511.

SUMMARY OF THE INVENTION

The present invention has been accomplished to provide a wheeled walker brake lever mounting structure, which eliminates the aforesaid drawbacks. According to one aspect of the present invention, the wheeled walker brake lever mounting structure comprises a mounting base frame fixedly fastened to one handlebar of a wheeled walker, a brake cable inserted through the mounting base frame and connected to a brake assembly at the rear wheels of the wheeled walker, and a brake lever coupled to the mounting base frame and connected to the brake cable for turning by hand in either of two reversed directions to pull the brake cable and to further stop the wheeled walker. According to another aspect of the present invention, an auxiliary control block coupled to one side of the mounting base frame for turning with the hand to move the brake lever upwards or downwards and to achieve a braking action.

DETAILED DESCRIPTION OF THE PREFERRED EMBODIMENT

Figure 1:
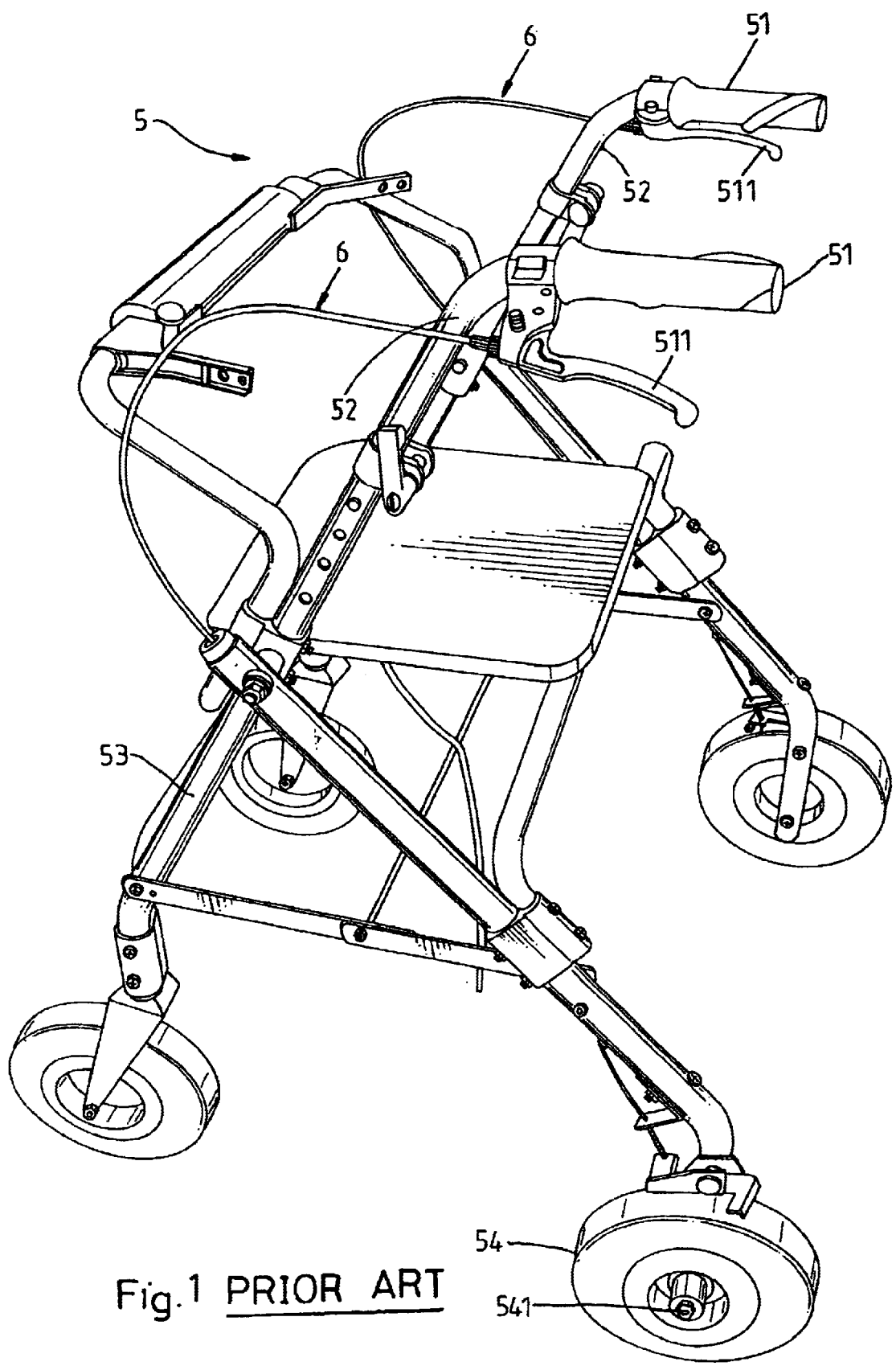
FIG. 1 is a perspective view of a wheeled walker constructed according to the prior art.
Figure 2:
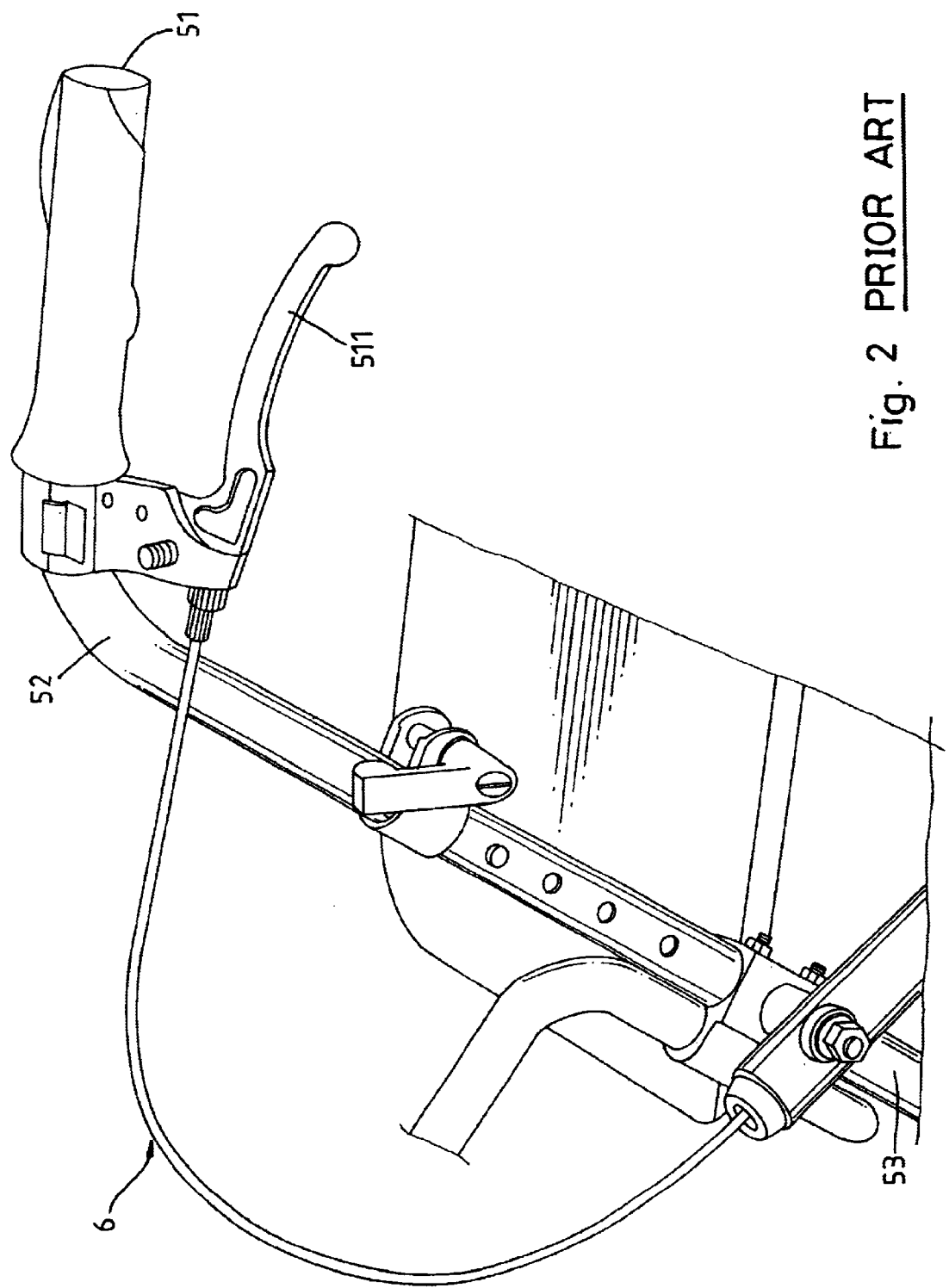
FIG. 2 is an enlarged view of a part of the wheeled walker shown on FIG. 1.

Referring to FIGS. from 3 through 10, a wheeled walker brake lever mounting surface in accordance with the present invention is shown comprised of a mounting base frame 1, a brake cable 3, and a brake lever 4. The mounting base frame 1 comprises a top wall 10, a front wall 15, a bottom wall 16, a left sidewall 13, a right sidewall 19, a barrel 11 integral with the top wall 10, a wire hole 161 extended through the bottom wall 16, and a wire guide 160 fixedly fastened to the wire hole 161. The barrel 11 has an axially extended mounting hole 111, which receives the handlebar 2 of the wheeled walker (not shown), and a traverse screw hole 1111, which receives a tightening up screw 112 that fixes the barrel 11 to the handlebar 2. The brake lever 4 is pivoted to the mounting base frame 1 between the sidewalls 13 and 19, having a bottom locating hole 430 near the front side thereof and a backwardly extended handhold portion 42 for the holding of the hand. The brake cable 3 is inserted through the wire guide 160 in the wire hole 161, having one end terminating in an end rod 30, which is fastened to the locating hole 430 of the brake lever 4, and the other end fastened to the rear wheel brake assembly (not shown) of the wheeled walker.

The main features of the present invention are outlined hereinafter with reference to FIGS. from 3 through 10 again. The mounting base frame 1 further comprises a stop block 151 inwardly protruded from the inner surface of the front wall 15 and forming a stop face 1511, a recessed positioning portion 152 disposed on the inside between the front wall 15 and the top wall 10, and two pivot holes 131 and 191 respectively extended through the left sidewall 13 and the right sidewall 19 and aligned in a line. The brake lever 4 further comprises a base block 44 connected to one end of the handhold portion 42, a conical front protruding block 43 perpendicularly forwardly protruded from the front side of the base block 44, a coupling slot 441 of arched cross section transversely extended through the base block 44 and pivotally connected between the pivot holes 131 and 191 by a pivot 14 and a screw 141, a top positioning groove 4411 transversely disposed in the top side of the coupling slot 441, and a bottom positioning groove 4412 transversely disposed in the bottom side of the coupling slot 441. The positioning grooves 4411 and 4412 are not vertically aligned.

Figure 9:
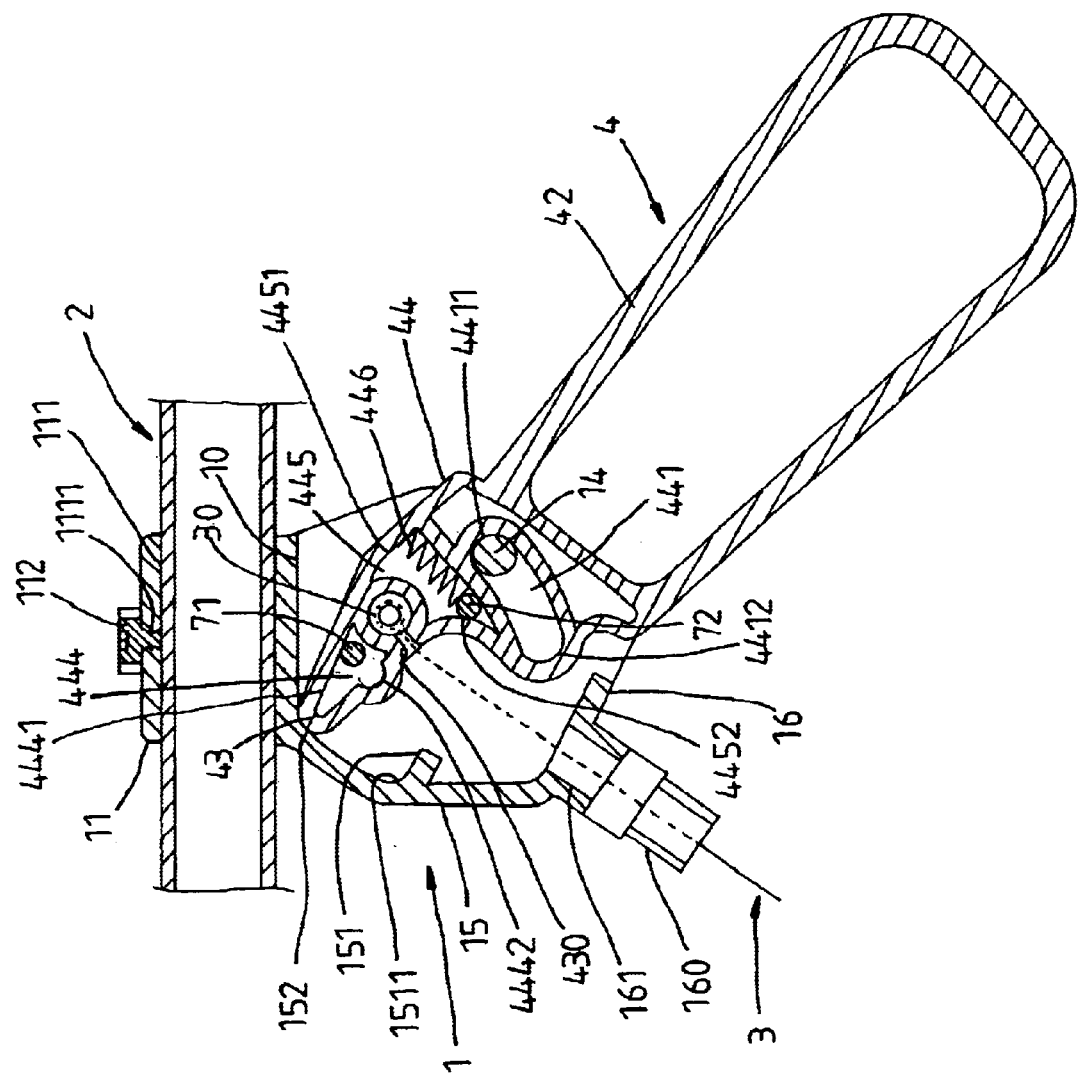
FIG. 9 is a sectional view of the wheeled walker brake lever mounting structure according to the present invention.
Figure 10:
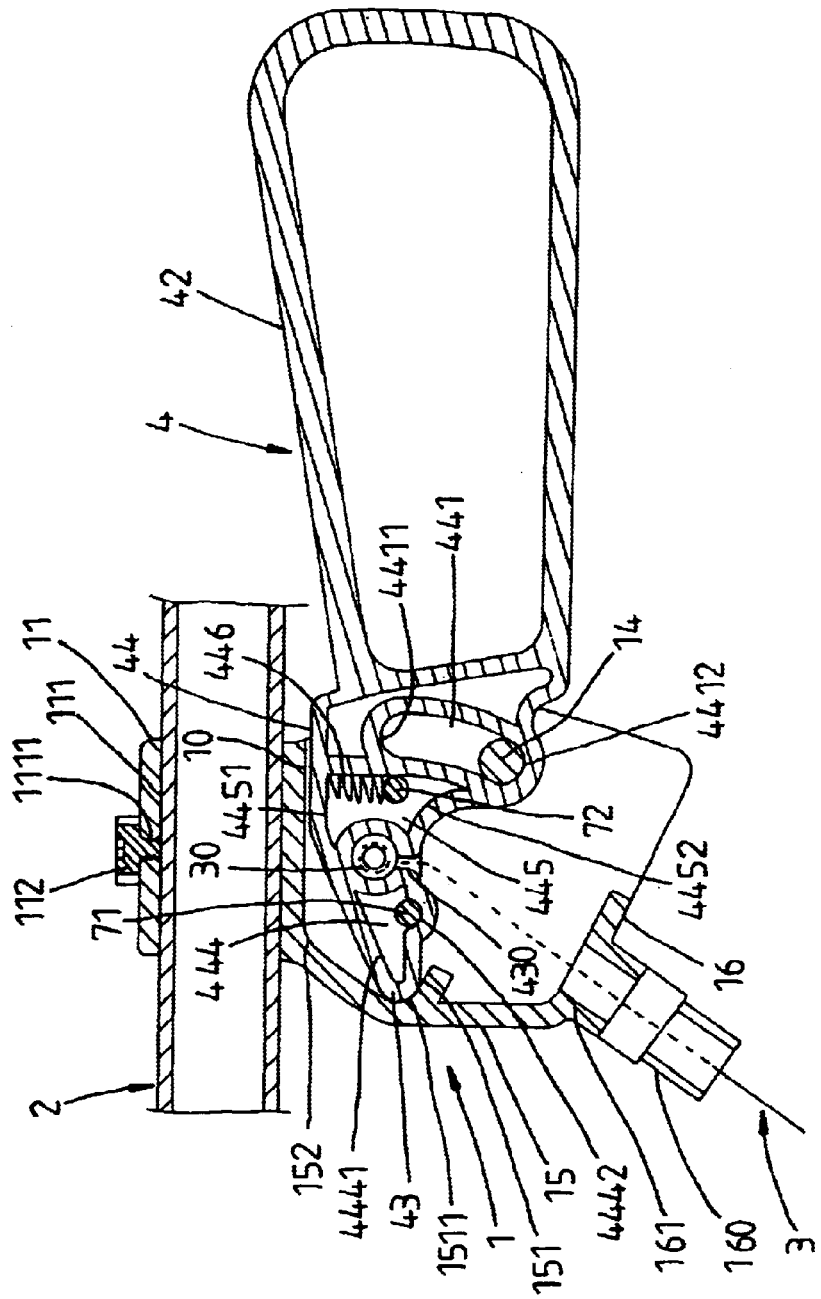
FIG. 10 is similar to FIG. 9 but showing the brake lever turned upwards, the brake cable stretched.

When the user turns the handhold portion 42 of the brake lever 4 downwards to pull up the brake cable 3, the top positioning groove 4411 of the base block 44 of the brake lever 4 is stopped at the pivot 14, the front side of the conical front protruding block 43 of the brake lever 4 is stopped at the recessed positioning portion 152 of the mounting base frame 1, achieving a brake action (see FIG. 9). When the user turns the handhold portion 42 of the brake lever 4 upwards to pull the brake cable 3 and to force the bottom positioning groove 4412 of the base block 44 of the brake lever 4 into engagement with the pivot 14, the front side of the front protruding block 43 of the brake lever 4 is stopped at the stop face 1511 of the stop block 151, achieving a brake action (see FIG. 10).

Further, because the locating hole 430 is provided at the bottom side of the brake lever 4 and facing downwards, and the wire hole 161 is formed in the bottom wall 16 of the mounting base frame 1 and facing downwards the brake cable 3 is supported in the brake lever 4 and the mounting base frame 1 at a location relatively closer to the wheel axles of the rear wheels of the wheeled walker. Therefore, the wheeled walker is stable when the user operated the brake lever 4 to stop the wheeled walker suddenly.

Figure 3:
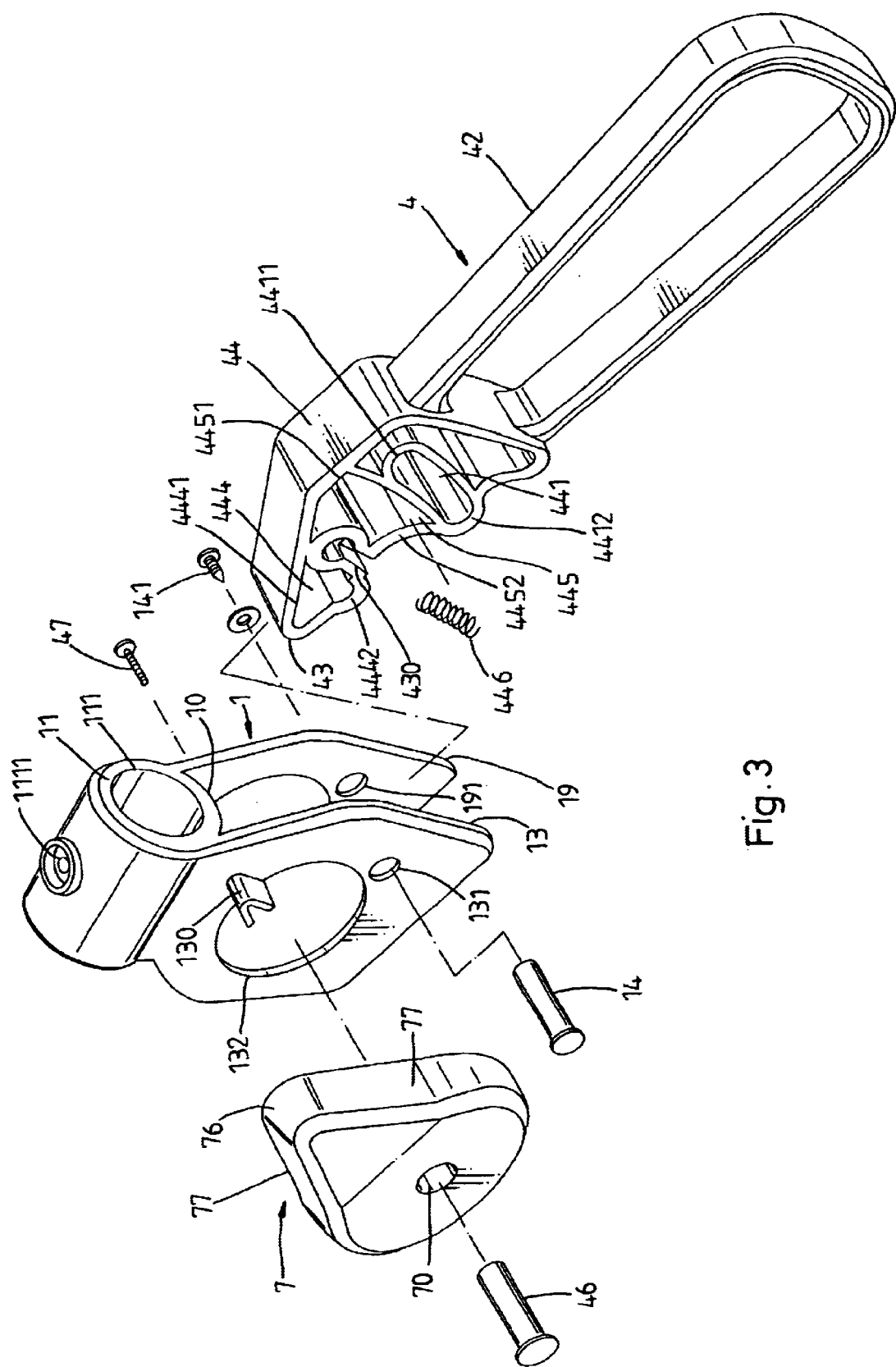
FIG. 3 is an exploded view of a wheeled walker brake lever mounting structure according to the present invention.
Figure 4:
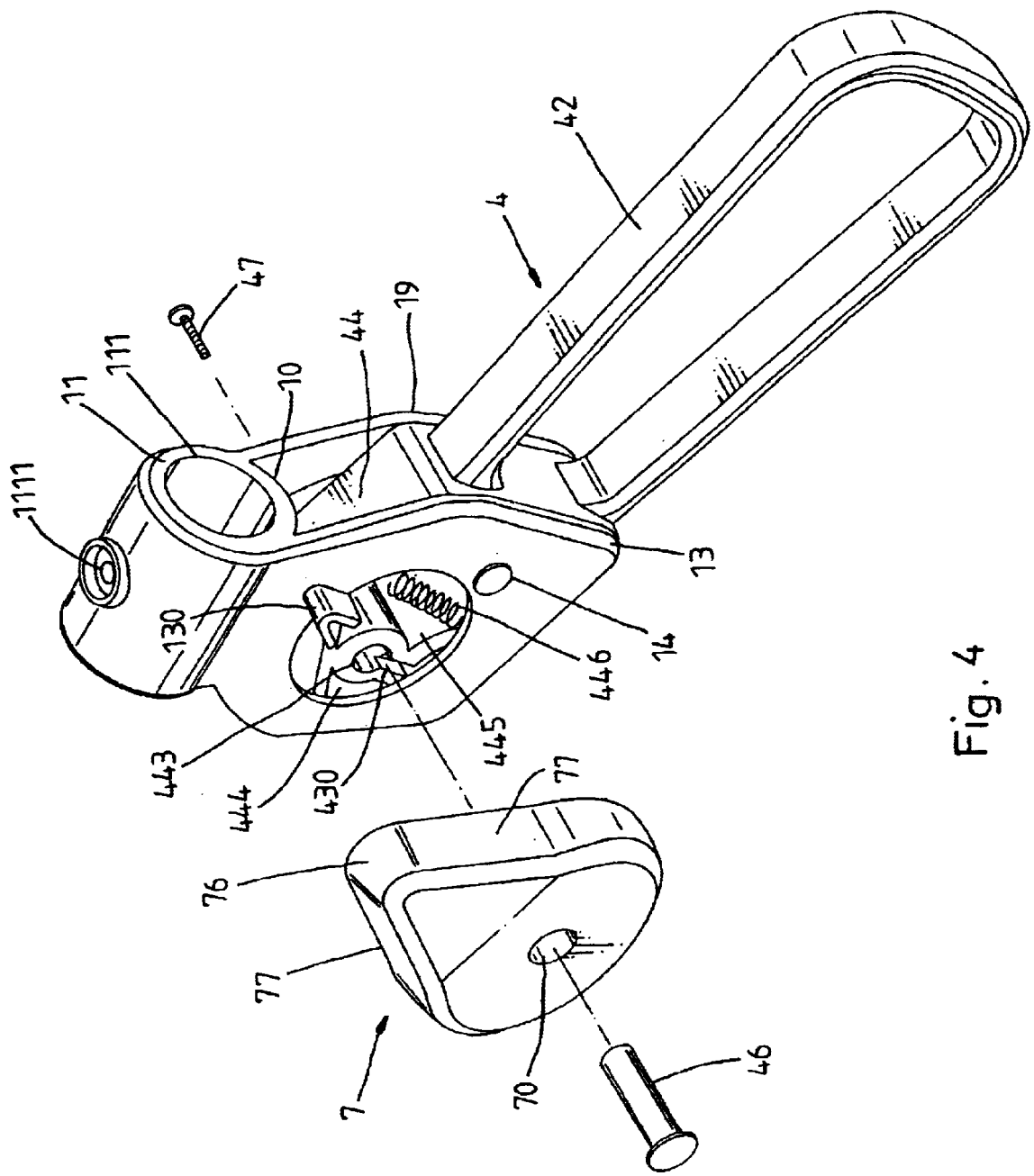
FIG. 4 is another exploded view of the present invention after installation of the brake lever in the mounting base frame.
Figure 5:
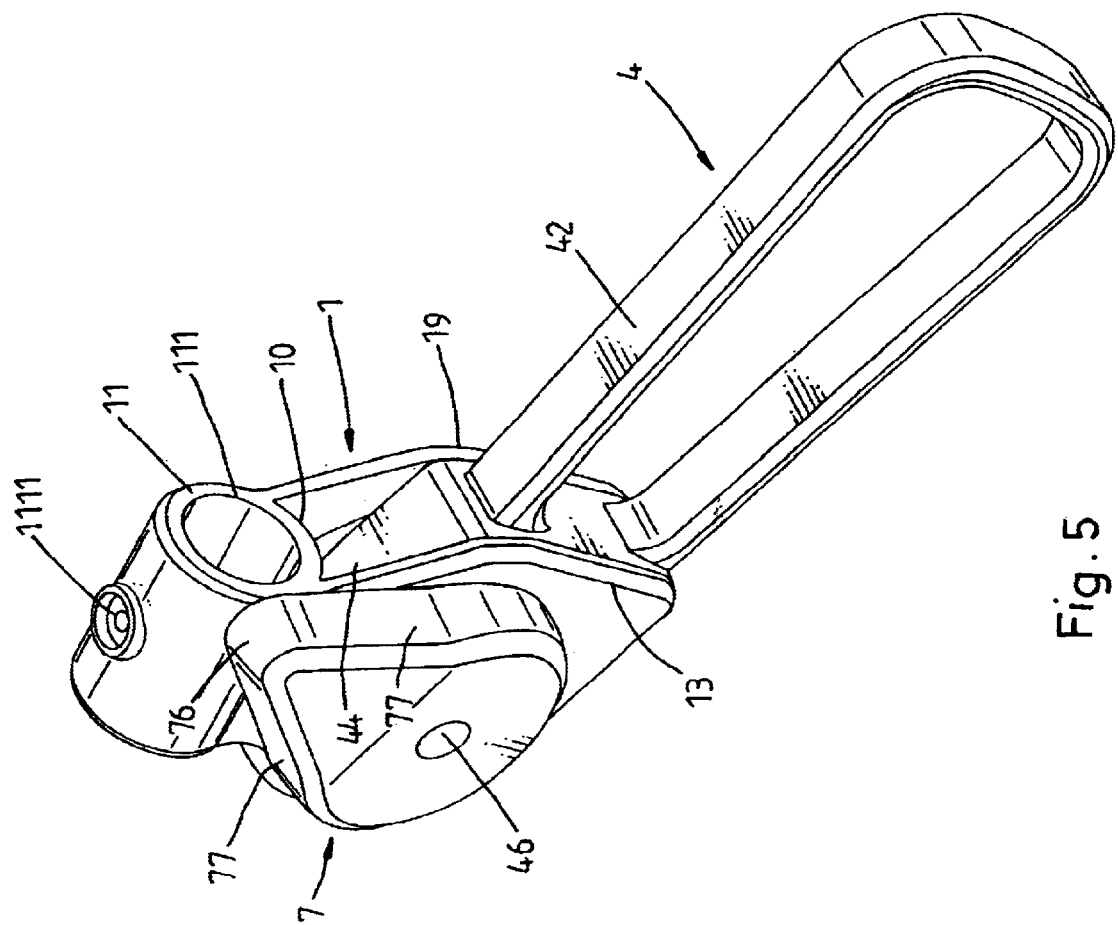
FIG. 5 is an elevational view showing the wheeled walker brake lever mounting structure assembled.
Figure 6:
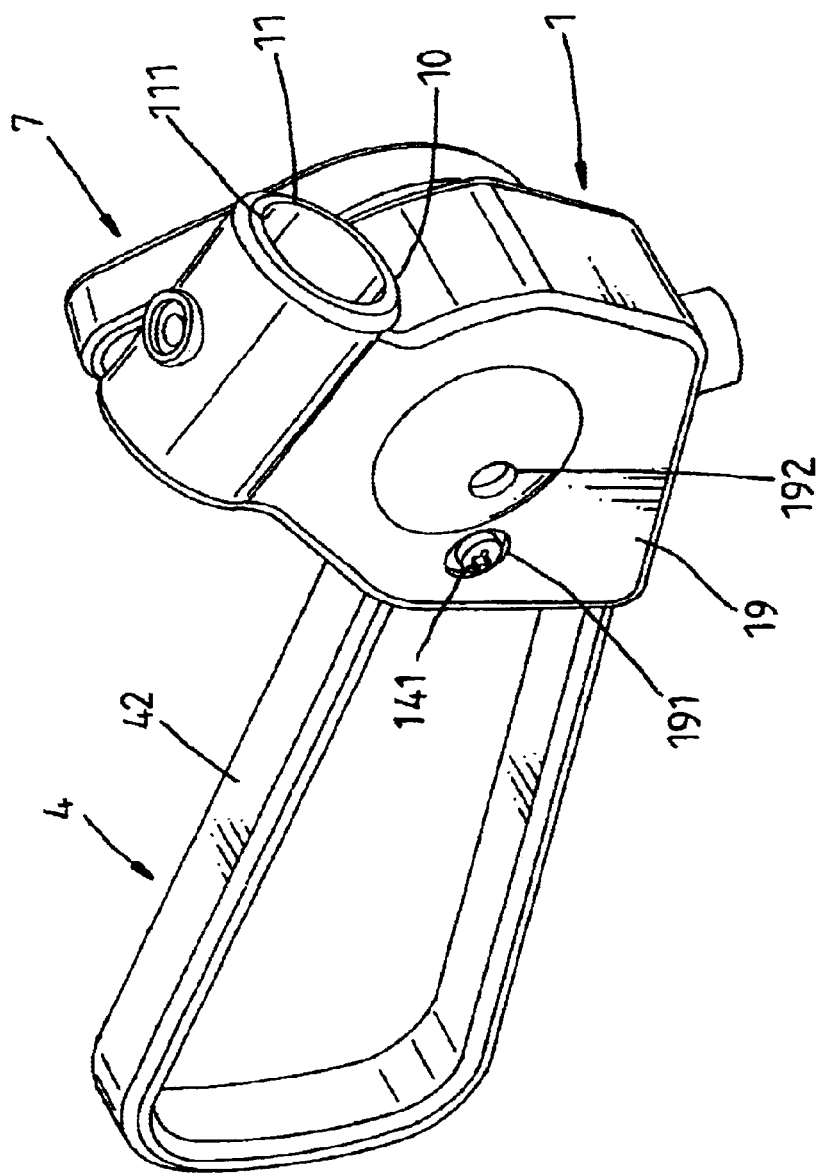
FIG. 6 is another elevational view of the wheeled walker brake lever mounting structure when viewed from another angle.
Figure 7:
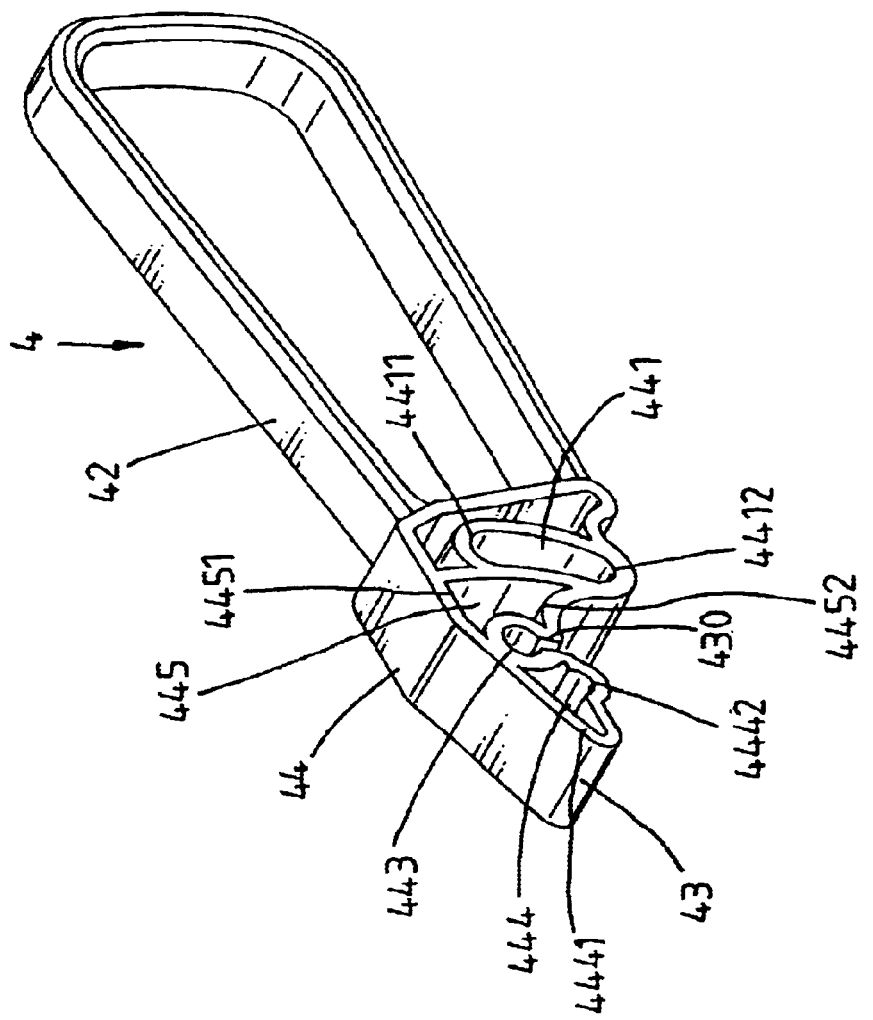
FIG. 7 is an elevational view of the brake lever for the wheeled walker brake lever mounting structure according to the present invention.
Figure 8:
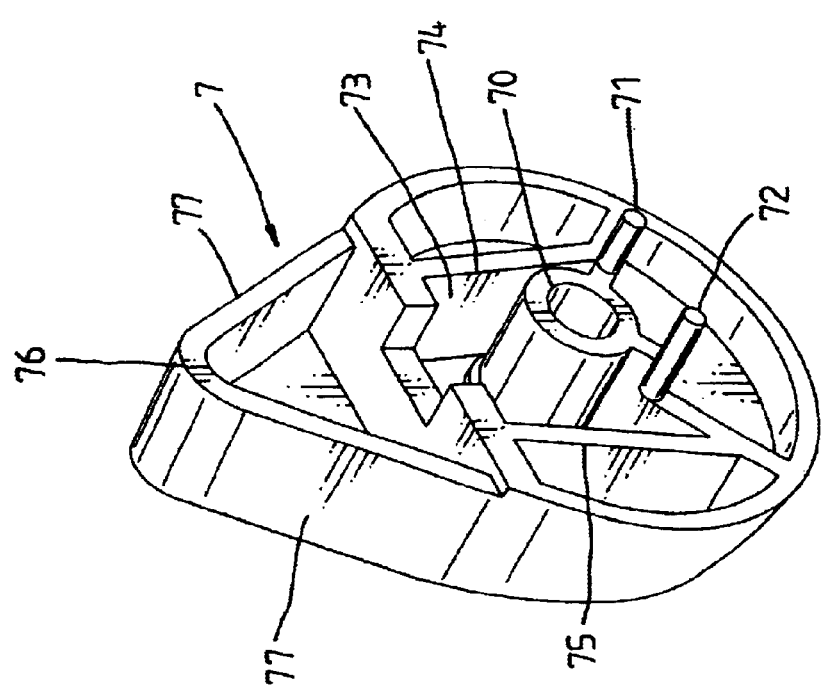
FIG. 8 is an elevational view of the auxiliary control block for the wheeled walker brake lever mounting structure according to the present invention.

The mounting base frame 1 further comprises a through hole 192 in the right sidewall 19, a circular opening 132 in the left sidewall 13, and a protruded block 130 outwardly protruded from the left sidewall 13 above the circular opening 132 (see FIG. 3). The base block 44 of the brake lever 4 comprises a transverse pivot hole 443, a first open chamber 444 at the front side of the transverse pivot hole 443, a second open chamber 445 at the back side of the transverse pivot hole 443. An auxiliary control block 7 is coupled to the mounting base frame 1 and the brake lever 4 at one side around the protruded block 130. The auxiliary control block 7 has a pivot hole 70 connected to the transverse pivot hole 443 of the brake lever 4 and the through hole 192 of the mounting base frame 1 by a pivot 46 and a screw 47. The screw 47 is mounted in the through hole 192 and fastened to one end of the pivot 46, which is inserted through the pivot hole 70 of the auxiliary control block 7, the circular opening 132 of the mounting base frame 1, and the transverse pivot hole 443 of the brake lever 4. The auxiliary control block 7 further comprises two stop pins 71 and 72 respectively inserted into the open chambers 444 and 445 in the base block 44 of the brake lever 4 (see FIG. 8), which receives the protruded block 130 of the mounting base frame 1, and two stop walls 74 and 75 perpendicularly extended from the back sidewall thereof at two sides of the back open chamber 73. When the user turned the auxiliary control block 7 downwards, one stop pin, namely, the first stop pin 71 is stopped at the top sidewall 4441 of the first open chamber 444, and the other stop pin, namely, the second stop pin 72 is stopped at the bottom sidewall 4452 of the second open chamber 445 to force the brake lever 4 downwards until one stop wall 74 of the auxiliary control block 7 has been stopped at the protruded block 130. The downward movement of the brake lever 4 pulls the brake cable 3 to stop the wheeled walker.

When the user turned the auxiliary control block 7 upwards, the first stop pin 71 is stopped at the bottom sidewall 4442 of the first open chamber 444, and the second stop pin 72 is stopped at the top sidewall 4451 of the second open chamber 445 to force the brake lever 4 upwards until the other stop wall 75 of the auxiliary control block 7 has been stopped at the protruded block 130. The upward movement of the brake lever 4 pulls the brake cable 3 to stop the wheeled walker.

Further, a return spring 446 is mounted in the second open chamber 445 of the base block 44 of the brake lever 4 and stopped against the second stop pin 72 (see FIG. 9), imparting a force to the auxiliary control block 7 to automatically return the auxiliary control block 7 to its former position after each operation.

The auxiliary control block 7 further has a smoothly arched nose 76 and two sloping sidewalls 77 respectively extended from the nose 76 at two sides convenient for the holding of the hand.

As indicated above, the present invention has advantages as follows:

1. The user can turn the brake lever 4 either upward or downward to pull the brake cable 3 and to further stop the wheeled walker. During installation, the end rod 30 of the brake cable 3 is fixedly fastened to the brake lever, and then the brake cable 3 is inserted through the wire hole 161 and connected to the brake assembly at the rear wheels of the wheeled walker, and then the pivot 14 is installed and fastened up with the screw 141 to secure the brake lever 4 to the mounting base frame 1. Therefore, the wheeled walker brake lever mounting structure is easy to install and inexpensive to manufacture.

2. A disabled person can operate the auxiliary control block to move the brake lever 4 downwards or upwards and to further pull the brake cable 3, causing the brake cable 3 to drive the brake assembly to stop the wheeled walker.

3. Because the brake cable 3 is supported in the brake lever 4 and the mounting base frame 1 at a bottom side, which is relatively closer to the wheel axles of the rear wheels of the wheeled walker, the wheeled walker is stable when the user operated the brake lever 4 or the auxiliary control block 7 to stop the wheeled walker suddenly.

A prototype of wheeled walker brake lever mounting structure has been constructed with the features of FIGS. 3~8. The wheeled walker brake lever mounting structure functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A wheeled walker brake lever mounting structure comprising a mounting base frame fastened to one handlebar of a wheeled walker, said mounting base frame comprising a top wall, a front wall, a bottom wall, a first sidewall, a second sidewall, a barrel integral with said top wall, a wire hole extended through said bottom wall, and a wire guide mounted in said wire hole, said barrel having an axially extended mounting hole, which receives the handlebar of the wheeled walker, and a transverse screw hole, which receives a tightening up screw that fixes said barrel to the handlebar of the wheeled walker, a brake lever pivoted to said mounting base frame between the first and second sidewalls of said mounting base frame, said brake lever having a locating hole near a front side thereof and a backwardly extended handhold portion for the holding of the hand, and a brake cable inserted through said wire guide in said wire hole, said brake cable having one end terminating in an end rod, which is fastened to the locating hole of said brake lever, and an opposite end fastened to a rear wheel brake assembly of the wheeled walker;

wherein said mounting base frame further comprises a stop block inwardly protruded from an inner surface of said front wall and forming, a stop face, a recessed positioning portion disposed on the inside between said frontwall and said top wall, and two pivot holes respectively extended through said left sidewall and said right sidewall and aligned in a line; said brake lever further comprises a base block connected to one end of said handhold portion, a conical front protruding block perpendicularly forwardly protruded from a front side of said base block, said conical front protruding block having a front side, a coupling slot of arches cross section transversely extended through said base block and pivotally connected between the pivot hole in said left sidewall and the pivot hole in said right sidewall by a pivot, a top positioning groove transversely disposed in a top side of said coupling slot, and a bottom positioning groove transversely disposed in a bottom side of said coupling slot, said top positioning groove and said bottom positioning groove being not vertically aligned; when the user turned said handhold portion of said brake lever downwards to pull up said brake cable, said top positioning groove of said base block of said brake lever is stopped at the pivot in the pivot holes of said left and right sidewalls, and the front side of the said conical front protruding block of said brake lever is stopped at the recessed positioning portion of said mounting base frame, achieving a brake action; when the user turned said handhold portion of said brake lever upwards to pull said brake cable and to force said bottom positioning groove of said base block of said brake lever into engagement with the pivot in the pivot holes of said left and right sidewalls, the front side of said conical front protruding block of said brake lever is stopped at said stop face of said stop block, achieving a brake action.

2. The wheeled walker brake lever mounting structure as claimed in claim 1, wherein the locating hole of said brake lever faces downwards, the wire hole of said mounting base frame formed in the bottom wall of said mounting base frame and facing downwards, said brake cable is supported in said brake lever and said mounting base frame at a location relatively closer to the wheel axles of rear wheels of the wheeled walker.

3. The wheeled walker brake lever mounting surface as claimed in claim 1, wherein said mounting base frame further comprises a through hole in said right sidewall, a circular opening in said left sidewall, and a protruding block outwardly protruded from said left sidewall above said circular opening; said base block of said brake lever comprises a transverse pivot hole, a first open chamber at a front side of said transverse pivot hole, a second open chamber at a back side of said transverse pivot hole; an auxiliary control block is coupled to said mounting base frame and said brake lever at one side around said protruded block, said auxiliary control block comprising a pivot hole connected to the transverse pivot hole of said brake lever and the through hole in said mounting base frame by a pivot, a first stop pin and a second stop pin respectively inserted into said first open chamber and said second open chamber in said base block os said brake lever, a back open chamber, which receives the protruded block of said mounting base frame, and a first stop wall and a second stop wall perpendicularly extended from a back sidewall thereof at two sides of said back open chamber; when the user turned said auxiliary control block downwards, said first stop pin is stopped at a top sidewall of said first open chamber, and said second stop pin is stopped at a bottom sidewall of said second open chamber to force said brake lever downwards and to further pull up said brake cable unit said first stop wall of said auxiliary control block has been stopped at said protruded block; when the user turned said auxiliary control block upwards, said first stop pin is stopped at a bottom sidewall of said first open chamber, and said second stop pin is stopped at a top sidewall of said second open chamber to force said brake lever upwards and to further pull up said brake cable until said second stop wall of said auxiliary control block has been stopped at said protruded block.

4. The wheeled walker brake lever mounting structure as claimed in claim 1 further comprising a return spring mounted in said second open chamber of said base block of said brake lever and stopped against said second stop pin.

* * * * *